Oct. 15, 1968  S. J. ANHOUSE ET AL  3,405,622
ELECTRONIC PHOTOGRAPHIC EXPOSURE TIMER
Filed Oct. 15, 1964  2 Sheets-Sheet 2

INVENTORS
S. J. ANHOUSE, G. A. BUON
BY
THEIR ATTORNEY

United States Patent Office 3,405,622
Patented Oct. 15, 1968

3,405,622
ELECTRONIC PHOTOGRAPHIC EXPOSURE TIMER
Stanley Jerome Anhouse, Kew Gardens, and Georges André Buon, Whitestone, N.Y., assignors to J. A. Maurer, Inc., Long Island City, N.Y. a corporation of New York
Filed Oct. 15, 1964, Ser. No. 404,095
7 Claims. (Cl. 95—53)

ABSTRACT OF THE DISCLOSURE

A camera shutter timing circuit controlling a shutter timing interval and including two capacitors which begin to charge when the shutter is opened to start the timing interval and one capacitor responsive to a predetermined voltage charge fires a unijunction transistor and thereafter discharges therethrough to produce a gating voltage for firing a silicon control rectifier through which the other capacitor discharges to stop the two capacitor charging and to close the camera shutter whereby the starting and stopping of the two capacitor charging determines the overall shutter timing interval.

---

This invention relates to timing mechanisms, and more particularly to an electronic exposure timer for cameras providing a wide range of timing intervals for bulb or time exposures for time exposure photography.

There are any number of mechanical exposure timers available at present for use in time exposure photography. Due to the very nature of these mechanical timers, the ranges of the time intervals are quite limited and the accuracy of the time intervals provided leaves much to be desired, particularly when the camera is being used under adverse environmental conditions. In mechanical exposure timers any extended range of time intervals requires complicated mechanisms held to very close tolerances and, depending on the range of time intervals provided, results in a cumbersome and often heavy unit for attachment to, or for incorporation within, the camera body, much too heavy and of too great volume for aerial or space cameras. Under adverse environmental conditions, as for instance under low temperature ambients, the accuracy of the time intervals provided by such mechanisms cannot be relied upon to provide the time exposure required. The degree of accuracy of the mechanical timer is dependent upon the manufacturing tolerances of the various elements constituting such a timer. When close tolerances are not maintained, the cumulative effect of these manufacturing errors results in substantial errors in the time intervals provided.

The object of the present invention is to provide self-powered and self-contained transistorized timing units which provide a wide range of timing intervals for bulb or time exposures, are readily adapted to and connected with standard camera shutters, have minimum space requirements, are of lightweight, and are improvements over the above-mentioned mechanical timers.

In accordance with the invention, a timing mechanism is provided in which two capacitors are connected in a D.C. circuit together with a plurality of selectable resistors which form the RC components of selectable timing interval circuits, a silicon controlled rectifier including a gate for controlling the discharge of one of the two capacitors and a unijunction transistor for controlling the discharge of the other capacitor. A selected timing interval is started by commencing the placement of a voltage charge on the two capacitors at the same time until the voltage on the other capacitor turns on the unijunction transistor permitting discharge of the last mentioned capacitor therethrough to provide a signal for activating the gate to turn on the silicon controlled rectifier permitting the discharge of the one capacitor therethrough to terminate the selected time interval.

A pushbutton arrangement is provided in which a cable release for the camera shutter is actuated and held by detent means until released by the energization of a solenoid. The depression of the pushbutton also closes a switch which activates the selected timing circuit. The camera shutter remains open until it is closed by a solenoid energized by the discharge of the capacitor controlled by the silicon controlled rectifier.

In the accompanying drawing,

FIGURE 3 is a front elevation of the timing mechanism; while

Figure 1:
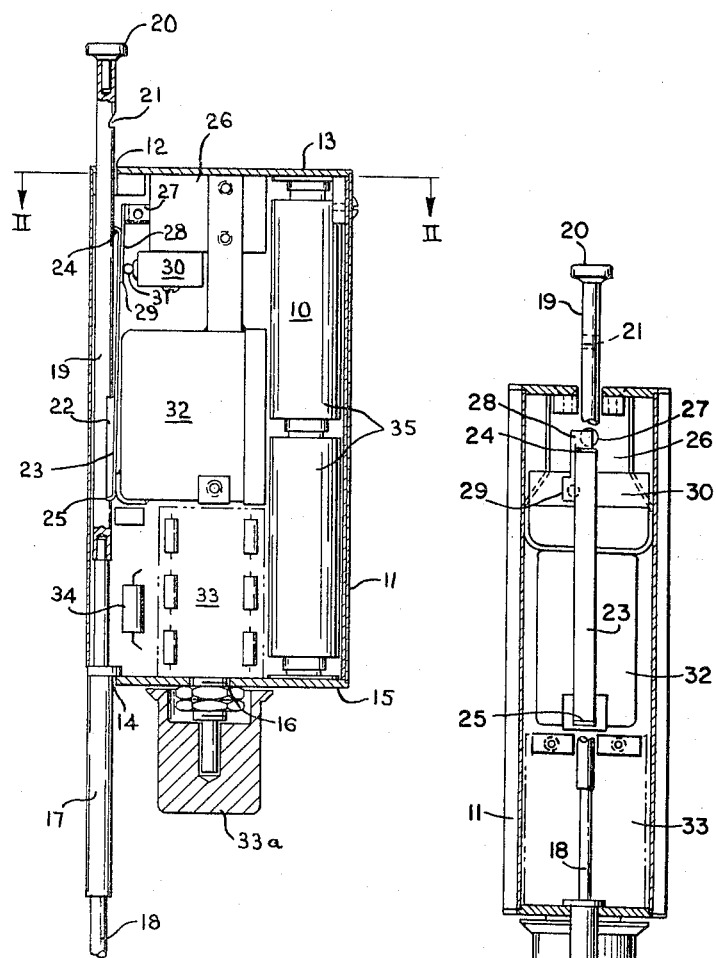
FIGURE 1 is a side elevation of an illustrative embodiment of the timing mechanism of our invention for use with aerial cameras showing the various elements disposed in a unitary housing.
Figure 2:
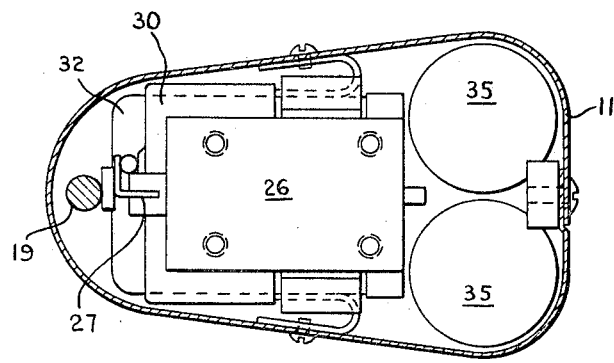
FIGURE 2 is a section taken along line II—II of FIGURE 1.

Referring now in detail to FIGURES 1 through 3, the timing mechanism 10 embodying the invention is enclosed in a unitary casing 11. Casing 11 is formed with an opening 12 in the top wall 13 thereof, an opening 14 in the bottom wall 15 in alignment with opening 12, and a third opening 16 in the bottom wall. Secured at and projecting through bottom wall opening 14 is a cable release 17 having the usual biased plunger cable 18 within a sheath, the lower end of the cable being provided with a suitable fitting (not shown) for attachment to the shutter mechanism of a camera. The upper end of plunger cable 18 is secured to the lower end of an actuator rod 19 which is slidably received through top opening 12 of casing 11 and extends above the top wall. The upper end region of rod 19 is provided with a knob or pushbutton 20. A peripheral notch 21 is formed in actuator rod 19 adjacent to its upper end, and an elongated longitudinal notch 22 is formed adjacent to the lower end thereof.

Suitably mounted within casing 11 is a double-purpose leaf spring 23 having a bent-over upper end 24 and a bent-over lower end 25, both of which are biased toward and abut actuator rod 19. As is apparent from the drawing, when pushbutton 20 is depressed, actuator rod 19 and plunger cable 18 are moved downwardly against the bias to the plunger cable until upper spring end 24 drops into notch 21 to hold actuator rod 19 in its depressed position. Lower spring end 24 rides within notch 22 and serves to limit the longitudinal movement of the actuator rod between the predetermined limits of its initial position and its depressed position.

Secured within casing 11 adjacent top wall 13 is a solenoid 26 having a plunger 27 extending toward the actuator rod 19 and leaf spring 23. Secured to the end of plunger 27 is a leaf spring 28 having secured to its free end an abutment plate 29. Secured to the underside of solenoid 26 is a microswitch 30 having an actuating button 31 which is abutted by abutment plate 29 secured to solenoid plunger 27. In the position as illustrated in FIGURE 1, switch 30 is open, but upon depression of pushbutton 20 and the registry of upper spring end 24 in notch 21, spring 28 and its abutment plate 29 will be moved toward the left to permit switch 30 to close. Upon energization of solenoid 26 in the manner hereinafter described, plunger 27 will be moved to the right to move upper spring end 24 out of notch 21 to permit actuator rod 19 to return to its initial position, the movement of the solenoid plunger moving the abutment plate and the upper spring end 24 to open switch 30.

Also mounted within casing 11 is a capacitor unit 32 and a multiposition switch 33. Associated with the multiposition switch is a plurality of resistors $R_1, R_2 \ldots R_n$ adapted to be connected selectively into the timing circuit below described by means of setting knob 33A. The multiposition switch 33 is such that but one of resistors $R_1, R_2 \ldots R_n$, is connected into the circuit by rotating knob 33A to a desired indexed position. Also secured within casing 11 is a resistance unit 34 and four small dry cells 35 which are stacked in pairs and series connected, as will hereinafter appear.

Figure 4:
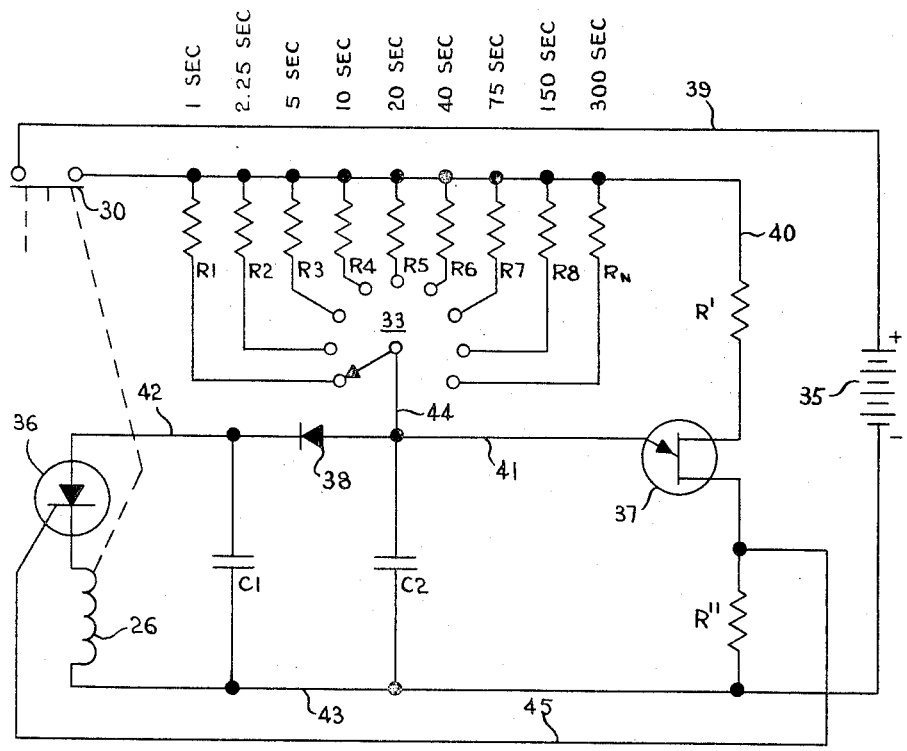
FIGURE 4 is an electrical schematic of the transistorized electronic timing circuit of the mechanism.

Referring now to the electrical schematic diagram of FIGURE 4, the various elements already described and herein shown are designated by the same reference numerals as in FIGURES 1 through 3. In addition to the units described as being enclosed in casing 11, there are additional units in the casing which are illustrated in FIGURE 4 in their schematic form but have not been shown in the prior figures. These additional units comprise a silicon controlled rectifier 36, a unijunction transistor 37, and a diode 38. Capacity unit 32 is illustrated in FIGURE 4 as comprising capacitors $C_1$ and $C_2$, the latter being hereinafter referred to as the pilot capacitor, while resistance unit 34 comprises resistors R' and R''. Capacitor $C_1$ is much larger than capacitor $C_2$; for example $C_1$ is 550 mmf., while $C_2$ is 1 mmf.

The plus terminal of the series connected batteries 35 is connected by lead 39, normally open contacts of switch 30, ends of resistors $R_1, R_2 \ldots R_n$, lead 40 and resistor R' to the base of unijunction transistor 37. The emitter E of the unijunction transistor is connected by lead 41 to one terminal of diode 38, the other terminal of diode 38 being connected by lead 42 to the anode A of silicon controlled rectifier 36. The cathode C of silicon controlled rectifier 36 is connected via solenoid 26, lead 43, and resistor R'' to the base $B_1$ of unijunction transistor 37, and further to the negative terminal of batteries 35. Capacitors $C_1$ and $C_2$ have first corresponding terminals connected to lead 43 and second corresponding terminals to leads 42 and 41, respectively, on the opposite sides of diode 38. The switch arm of multiposition switch 33 is connected by lead 44 to lead 41 between diode 38 and unijunction transistor 37. To complete the circuit, base $B_1$ of the unijunction transistor is connected by lead 45 to the gate terminal G of silicon controlled rectifier 36.

In operation of the timing circuit hereinabove described, the depression of pushbutton 20 will move cable 18 downwardly to open the shutter of the camera to which it is connected and at the same time to withdraw plunger 27 from solenoid 26 to close switch 30 to initiate operation of the timing circuit for the start of a timing interval. The camera shutter will remain open until solenoid 26 is energized to retract its plunger 27 to open switch 30 for terminating the timing interval, permitting the return of the plunger cable and the actuator rod to the initial position illustrated and opening switch 30.

The values of the resistors $R_1, R_2 \ldots R_n$, and of capacitors $C_1$ and $C_2$ are chosen to provide a wide range of exposure intervals, preferably in an approximately double geometric series, for example, to provide time exposures of 1 second, 2.5 seconds, 5 seconds . . . up to five minutes. Considering by way of example an exposure requirement of ten seconds, knob 33A of multiposition switch 33 is rotated to connect resistor $R_4$ into the timing circuit. Pushbutton 20 is then depressed to initiate the timing interval, closing switch 30 to complete the charging circuit for capacitors $C_1$ and $C_2$. At the start all voltage levels except across batteries 35 are zero. The charging circuit for capacitor $C_1$ may be traced from the plus terminal of batteries 35 through lead 39, closed switch 30, resistor $R_4$ and lead 44 to lead 41. The charging circuit for capacitor $C_1$ is completed through diode 38 and lead 43 to the negative terminal of the power supply and the charging circuit for capacitor $C_2$ is completed from lead 44 via the latter capacitor and lead 43 to the same negative terminal of the power supply. The time required to charge capacitor $C_1$ obviously is dependent upon the RC components of the charging circuit. In the given example, capacitor $C_1$ will be charged in ten seconds. At the same time, the voltage across pilot capacitor $C_2$ which, as stated, is many times smaller in capacitance than that of capacitor $C_1$, increases as a function of the RC constant $R_4C_1$. Thus, the voltage across capacitor $C_2$ tracks the voltage across capacitor $C_1$. Thus the emitter of unijunction transistor 37 is subjected to an exponentially increasing voltage during this circuit operation as supplied by the charge on capacitor $C_2$.

Unijunction transistor 37 is a three terminal device having a stable N-type negative resistance over a wide temperature range, and as long as the emitter voltage is less than the emitter peak point voltage, the emitter is reverse biased and substantially no current flows therethrough. When the emitter voltage exceeds this value and the emitter current is greater than the current corresponding to the emitter peak point voltage, the unijunction transistor fires, its firing level being at a fixed voltage of from about 0.65 to 0.7 of the voltage of batteries 35, the unijunction transistor firing voltage being provided by pilot capacitor $C_2$ when charged with a voltage having a magnitude equal to the emitter voltage just mentioned. When unijunction transistor 37 fires, basically the open circuit prevailing therefore thereat is replaced by a short circuit therethrough and capacitor $C_2$ is discharged suddenly through the latter transistor in the fired state and resistor R''. As capacitor $C_2$ discharges, a gating voltage developed across resistor R'' and applied over lead 45 activates gate G of the silicon controlled rectifier 36 which is thereby turned on. At the first instant of such discharge, a slight drop occurring in the voltage across pilot capacitor $C_2$ effectively cuts off diode 38; and thus, capacitor $C_1$ alone is of importance at the moment. The capacitor $C_1$ now discharges through the silicon controlled rectifier in the fired state and solenoid 26. As soon as the capacitor $C_1$ discharging current through solenoid 26 is sufficient in magnitude, solenoid 26 retracts its plunger 27 sufficiently to open switch 30 to discontinue the flow of current from batteries 35 to the charging circuits of the respective capacitors $C_1$ and $C_2$ for terminating the timing interval. Although the voltage drop across capacitor $C_1$ is decreasing, it is understood that as long as there is some voltage drop across capacitor $C_1$, silicon controlled rectifier 36 stays turned on. In other words, capacitor $C_1$ is forced fully to discharge through silicon controlled rectifier 36 before the latter is turned off. Thus, capacitor $C_1$ is fully discharged before silicon controlled rectifier 36 is turned off, and pilot capacitor $C_2$ has previously been fully discharged by the fired state of unijunction transistor 37. Thus, as both capacitors $C_1$ and $C_2$ are fully discharged in each cycle of the timing circuit, it is evident that each succeeding timing cycle is independent of the prior timing cycle, and no memory is involved.

For other time exposures, different from the one just described, it is obvious that the remaining respective resistors $R_1, R_2, \ldots R_n$ other than resistor $R_4$, are selected as desired to provide timing circuits operating in the manner.

It is apparent therefore that a very simple and rugged timing mechanism, of light weight and minimum space requirements, is provided by the present invention which permits of a wide range of accurately timed exposure intervals with no residual memory from cycle to cycle. Obviously where a space or a weight requirement, or both, is not a factor in the design of the above timing circuit, the power supply may originate in a source external to the unitary casing. In addition, it is also apparent that various other modifications will suggest themselves to the worker in the art without departing from the

What we claim is:

1. A timing circuit for controlling a given timing interval, comprising in combination:
a source of direct current voltage having positive and negative terminals,
first and second capacitors normally discharged and having corresponding one terminals connected to said source negative terminal,
a unidirectional diode connecting corresponding other terminals of said first and second capacitors and poled in a direction from said first capacitor to said second capacitor,
a switch having two spaced contacts and a third contact movable to engage said two contacts for closing said switch and to disengage said two contacts for opening said switch, said third contact normally disengaged from said two contacts for normally opening said switch, one of said two contacts connected to said source positive terminal,
a plurality of timing resistors having different resistance values and selectable one at a time for achieving said given timing interval to constitute an open series circuit including said source positive terminal, said third contact disengaged from said two contacts, selected one resistor and a point common to said first capacitor and diode,
a solenoid having a movable plunger connected to said third contact and withdrawn from said solenoid for actuating said third switch contact into engagement with said two switch contacts to close said series circuit to begin the simultaneous charging of said first and second capacitors for starting said given timing interval,
means for producing a gating voltage,
a unijunction transistor having an emitter connected to said first capacitor other terminal and two base terminals of which one is connected through said engaged switch contacts to said source positive terminal and a second through said voltage gating means to said source negative terminal for causing said last-mentioned means to produce a gating voltage pulse in response to the turn on of said transistor as said first capacitor is charged to a predetermined voltage and thereafter is discharged through said turned on transistor and gating means,
and a silicon controlled rectifier having an anode connected to said second capacitor other terminal, a cathode connected through said solenoid to said source negative terminal, and a gate connected to a point common to said transitor second gate terminal and voltage gating means, said gate activated by said gating voltage pulse to turn on said rectifier for discharging said second capacitor through said turned on rectifier and solenoid and thereby to energize said solenoid to retract said plunger thereinto to disengage said third switch contact from said two switch contacts for opening said series circuit and interrupting the charging of said first and second capacitors to terminate said given timing interval.

2. A timing circuit according to claim 1 wherein the capacitors are different in capacitance by an order of 550 to 1.

3. A timing circuit for controlling a given timing interval, comprising in combination:
a source of direct current voltage having positive and negative terminals,
first and second capacitors normally discharged and having corresponding one terminals connected to said source negative terminal,
a unidirectional diode connecting corresponding other terminals of said capacitors and poled in a direction from said first capacitor to said second capacitor,
a switch having two spaced contacts and a third contact movable to simultaneously engage said two contacts for closing said switch and to simultaneously disengage said two contacts for opening said switch, said third contact normally disengaged from said two contacts for normally opening said switch, one of said two contacts connected to said source positive terminal,
a plurality of timing resistors having different resistance values for fixing different timing intervals and having corresponding ends connected to a second of said two switch contacts while corresponding opposite ends are free,
an electrically conductive swinger having one end connected to a point common to said diode and first capacitor and an opposite end connectable to a free end of a preselected one of said timing resistors for fixing said given timing interval,
a solenoid having a movable plunger connected to said switch third contact and withdrawn from said solenoid for actuating said third switch contact to engage simultaneously said two switch contacts to begin the simultaneous charging of said first and second capacitors with the voltage of said source for starting said given timing interval,
a gating resistor,
a unijunction transistor having an emitter connected to said first capacitor other terminal and two base terminals of which one is connected through said last-mentioned engaged switch contacts to said source positive terminal and a second through said gating resistor to said source negative terminal for enabling said last-mentioned resistor to produce a gating voltage pulse in response to the turn-on of said transistor as said first capacitor is charged to a predetermined voltage and thereafter is discharged through said turned on transistor and gating resistor, 4. A timing circuit according to claim 1 which includes:
a further resistor connected in series with said unijunction transistor one base terminal, third switch contact engaging said two switch contacts and source positive terminal,
and said gating voltage means comprising an additional resistor, said second base terminal of said transistor connected through said additional resistor to said source negative terminal and said gate connected to a point common to said transistor second base terminal and additional resistor, said further and additional resistors reverse biasing said unijunction transistor emitter for determining the predetermined voltage required across said first capacitor to fire said last-mentioned transistor.

5. A timing circuit according to claim 6 in which said shutter means comprises:
a rod having a notch in a peripheral surface thereof and biased to said first position,
a detent attached to said plunger for slidable engagement with said peripheral surface of said rod and spaced from said notch when said rod is biased to said first position and said plunger is normally disposed in said solenoid to disengage said third switch contact from said two switch contacts upon the closing of said shutter, said detent disposed in said notch to hold said rod in said second position as said rod is operated from said first position to said second position to open said shutter and as said plunger is withdrawn from said solenoid to actuate said third switch contact into engagement with said two switch contacts to begin the charging of said first and second capacitors, said detent displaced from said notch to enable said rod to return to said first position as said solenoid is energized to retract said plunger thereinto to disengage said third switch contact from said two switch contacts to terminate the charging of said first and second capacitors.

6. The timing circuit according to claim 6 in which said gating voltage means comprises a further resistor through which said second base terminal of said unijunction transistor is connected to said source negative terminal for producing the gating voltage, and said gate of said silicon controlled rectifier is connected to a point common to said further resistor and last-mentioned transistor second base terminal.

7. A timing circuit for controlling the operating time interval of a camera shutter opened mechanically and closed electrically, comprising in combination:

mechanical means biased to a first position for closing said shutter and operable to a second position for opening said shutter, a source of direct current voltage having positive and negative terminals, first and second capacitors normally discharged and having corresponding one terminals connected to said source negative terminal, a unidirectional diode connecting corresponding other terminals of said first and second capacitors and poled in a direction from said first capacitor to said second capacitor, a switch having two spaced contacts and a third contact movable to simultaneously engage said two contacts for closing said switch and to simultaneously disengage said two contacts for opening said switch, said third contact normally disengaged from said two contacts for normally opening said switch when said shutter means is biased to said first position for closing said shutter, one of said two contacts connected to said source positive terminal, a plurality of timing resistors having different resistance values for fixing different timing intervals and having corresponding ends connected to a second of said two switch contacts while corresponding opposite ends are free, an electrically conductive swinger having one end connected to a point common to said diode and first capacitor other terminal and an opposite end connectable to a free end of a preselected one of said timing resistors for fixing a given timing interval, a solenoid including a plunger mechanically connected to said shutter means and third switch contact and normally disposed in said solenoid when said shutter is closed, said plunger withdrawn from said solenoid in response to the operation of said shutter means from said first position to said second position upon the opening of said shutter to engage said last-mentioned contact with said two switch contacts to begin the simultaneous charging of said first and second capacitors with a voltage from said source for starting said given shutter operating timing interval, means for producing a gating voltage, a unijunction transistor having an emitter connected to said first capacitor other terminal and two base terminals of which one is connected through said last-mentioned engaged switch contacts to said source positive terminal and a second through said gating means to said source negative terminal for enabling said last-mentioned gating means to produce a voltage pulse in response to the turn on of said transistor as said first capacitor is charged to a predetermined voltage and thereafter is discharged through said turned on transistor and gating means, and a silicon controlled rectifier including an anode connected to said second capacitor other terminal, a cathode connected through said solenoid to said source negative terminal, and a gate connected to a point common to said transistor second base terminal and gating voltage means, said gate activated by said gating voltage pulse produced by said gating voltage means to turn on said last-mentioned rectifier for discharging said second capacitor through said turned on rectifier and solenoid to energize said solenoid to retract said plunger thereinto to disengage said third switch contact from said two switch contacts for interrupting the charging of said first and second capacitors thereby terminating said given shutter operating timing interval and enabling said shutter means to return to said first position to close said shutter.

References Cited

UNITED STATES PATENTS

| | | | |
|---|---|---|---|
| 2,960,636 | 11/1960 | Fitzpatrick | 317—141 |
| 3,131,318 | 4/1964 | Snyder et al. | 317—148.5 |
| 3,205,411 | 9/1965 | Culbertson | 317—142 |

JOHN M. HORAN, *Primary Examiner.*